March 4, 1952
W. F. JONES
2,588,122
ARRANGEMENT FOR COLLECTING AND UTILIZING
NATURAL GAS LEAKAGE FROM A CENTRIFUGAL
COMPRESSOR EMPLOYED ON A PIPE LINE
Filed April 21, 1948
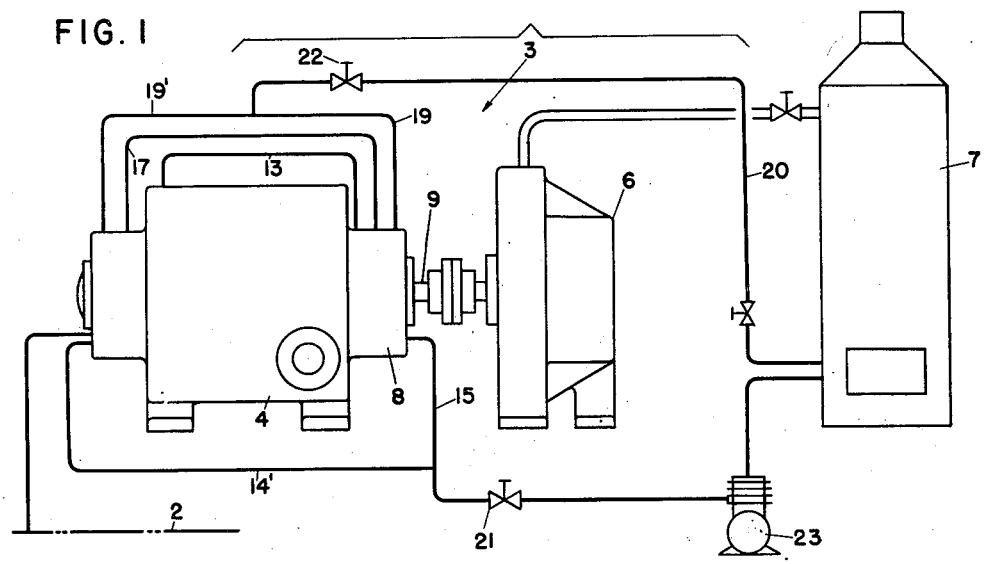
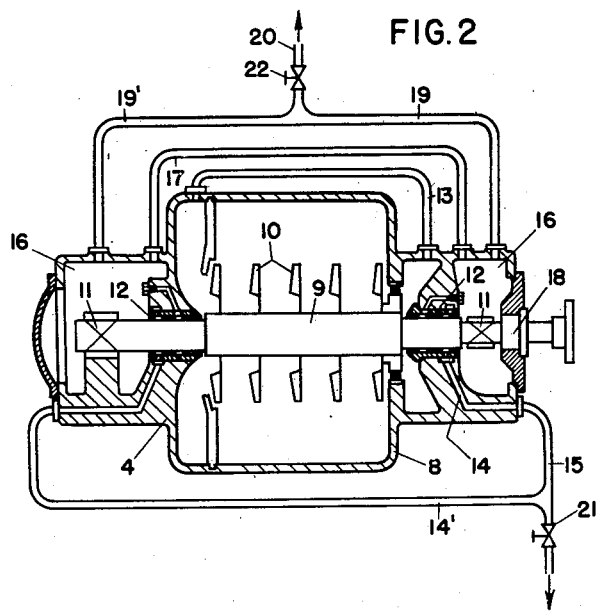
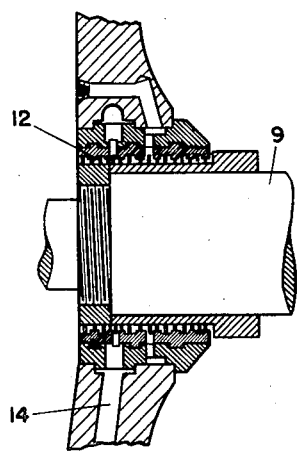
INVENTOR.
Walter F. Jones
BY Patented Mar. 4, 1952

2,588,122

UNITED STATES PATENT OFFICE 2,588,122

ARRANGEMENT FOR COLLECTING AND UTILIZING NATURAL GAS LEAKAGE FROM A CENTRIFUGAL COMPRESSOR EMPLOYED ON A PIPE LINE

Walter F. Jones, Washington, Conn., assignor to Carrier Corporation, Syracuse, N. Y., a corporation of Delaware Application April 21, 1948, Serial No. 22,404

5 Claims. (Cl. 48—194)

1

This invention relates to an arrangement for collecting and utilizing natural gas leakage from a centrifugal compressor employed on a pipe line to boost the pressure of the gas during transportation from a source of supply, such as a well, to the place of use. More particularly, it relates to the utilization of the leakage gas to supply power for operation of the compressor.

Reciprocating compressors have been employed for booster service on pipe lines. Compared to centrifugal machines, reciprocating equipment is highly expensive. Consequently, it is desirable on many applications to use centrifugal machines in place of reciprocating machines. Since natural gas is transmitted in pipe lines at pressures of 500 to 900 p. s. i. a., it is essential that high pressure seals be provided to prevent leakage of gas along the shaft of the compressor or some other means must be provided to prevent the leakage of gas into the surrounding atmosphere. High pressure rotary type seals capable of withstanding such pressures have not been developed to a point where they are sufficiently reliable for the application.

The chief object of the present invention is to provide an arrangement in which leakage of natural gas along the shaft of the compressor is minimized by use of simple labyrinths, escaping gas being collected and utilized for the purpose of operating the compressor, thereby obviating the need for high pressure seals, decreasing the expense of operation of the compressor and providing a much greater degree of reliability and safety from explosion hazards.

An object of my invention is to provide an arrangement of this type in which a gas fired steam boiler is employed to generate steam which actuates a turbine which, in turn, drives the centrifugal compressor, gas leakage along the shaft of the compressor being burned usefully in the boiler. Alternately a gas fired combustion turbine may be employed and the gas leakage employed in the operation of such turbine.

A further object is to provide a centrifugal compressor adapted to be employed in connection with the transportation of natural gas through pipe lines, the compressor including simple labyrinth seals at each end of the compressor shaft, the gas escaping through the labyrinths being collected and utilized in the operation of the actuating means for the compressor. In addition, any gas which escapes into the bearing spaces of the compressor may likewise be removed and utilized for the same purpose, all of this being accomplished without the need of a high pressure seal.

2

Other objects of my invention will be readily perceived from the following description.

This invention relates to an arrangement in which a centrifugal compressor is employed in the transportation of natural gas through pipe lines from a source of supply, such as a well, to the place of use. The centrifugal compressor may be actuated by a steam turbine or a gas fired combustion turbine. A gas fired boiler may be employed to provide steam for the steam turbine. The compressor is provided with labyrinths sealing the ends of its shaft. Connections are provided to such labyrinths to permit gas escaping therethrough to be collected. The collected gas is supplied to the gas fired boiler or to the gas fired combustion turbine and utilized to provide power for the operation of the compressor. The collecting of the gas in a suitable conduit assures that the pressure in the bearing spaces of the compressor is only moderately above atmospheric pressure. Gas may likewise be collected from the bearing spaces and utilized for the same purpose. Since with this arrangement the bearing spaces are at a pressure only moderately above atmospheric pressure, standard contact seals now available and of proven reliability may be employed to seal the compressor shaft against leakage to the surrounding atmosphere.

The attached drawing illustrates a preferred embodiment of my invention, in which Figure 1 is a diagrammatic view of the arrangement employed for the utilization of natural gas escaping from the compressor;

Figure 2 is a sectional view of a compressor, illustrating the manner in which labyrinth leakage is collected for supply to the boiler or combustion turbine; and Figure 3 is a sectional view in exaggerated scale of a labyrinth employed in the compressor.

Referring to the drawing, there is shown a pipe line 2 for the transportation of natural gas from the source of supply to place of use. It will be appreciated that gas in such a pipe line is maintained at high pressure, such as 500 p. s. i. a. or higher. Since the gas in the line loses pressure proportionately to the distance it travels, it is customary to provide compressor stations at spaced intervals along the pipe line to recover the pressure which is lost due to the flow in the line. A compressor station is shown at 3, including a compressor 4, together with suitable means to actuate the compressor. Such means may comprise a steam actuated turbine 6 together with a gas fired boiler 7 which provides steam for turbine 6. If desired, a gas fired combustion turbine may be employed in place of turbine 6 and boiler 7. If desired, boiler 7 may be fired by either oil or coal and under such conditions the present invention may be utilized. Moreover, if a combustion turbine is used alternately, it may be oil fired or fired with pulverized coal and under such conditions the present invention may be utilized.

Compressor 4 consists of a casing 8 enclosing a shaft 9, carrying impellers 10. Shaft 9 is mounted in bearings 11, disposed at the ends thereof. To partially seal shaft 9 and minimize leakage of natural gas, labyrinths 12 are provided at each end of the shaft. Labyrinths 12 are used at both the suction and discharge ends of the compressor. When the compressor is of the type requiring a balancing piston to take up the thrust an equalizer line 13 may be provided. Pressure, for example 500 p. s. i. a., exists at each labyrinth 12 and labyrinth 12 minimizes leakage of gas along shaft 9. At any suitable point along labyrinth 12, the labyrinth is connected by conduits 14 and 15 to the exterior of casing 8. Conduit 14 is connected along with conduit 15 to boiler 7 or other means provided to utilize the labyrinth leakage gas. It will be noted (refer to Figure 2) that similar means are provided at each labyrinth 12, conduit 14', being connected to conduit 15 as described above. Provision of conduits 14 and 14' permits labyrinth leakage gas to be collected and utilized in the operation of the compressor.

It will be evident that all of the leakage through the labyrinth is not collected in conduits 14 and 14', since a minor portion thereof continues through labyrinth 12 to bearing spaces 16. It is desirable that spaces 16 be maintained at a pressure moderately above atmospheric pressure in order to prevent entrance of air into the compressor. It is undesirable, however, for the pressure in such spaces to be at too high a point for the greater the pressure in such spaces, the greater is the absorption of the gas by the oil supplied to the bearings 11 of compressor 4. It may be desirable to provide a line 17 to insure equalization of the pressures in bearing spaces 16. Since the pressure in such spaces is only moderately greater than atmospheric pressure, the spaces may be sealed by any suitable standard contact seal 18. Piping 19 and 19' are connected to such spaces in order to collect excess gas from such spaces and to supply such gas to the boiler or combustion turbine through line 20. Valves 21 and 22 are disposed in lines 15 and 20, respectively, in order to regulate flow of gas through such lines.

Under some conditions of operation it may be desirable to increase the pressure of the labyrinth leakage gas when it is utilized in connection with the operation of a combustion turbine. For this purpose a small compressor 23 may be provided. The gas in conduits 15 and 20 is supplied to compressor 23 which compresses such gas to the required pressure in the combustion turbine. Alternately the required pressure for the combustion turbine may be obtained by maintaining a higher pressure in the bearing spaces of the compressor, since the standard contact seal 18 is entirely suitable for pressures moderately above atmospheric pressure.

The present invention provides an efficient and economical arrangement whereby transportation of natural gas through pipe lines may be conducted at low initial and operating costs. The present invention permits the use of centrifugal compressors for such purpose and eliminates the provision of a high pressure seal for the centrifugal compressor to prevent leakage of the gas under compression to the atmosphere. Such high pressure seals are eliminated by permitting a minor amount of leakage, collecting the escaping gas and utilizing the escaped gas to provide power for the operation of the compressor. The present invention permits a low cost centrifugal compressor to be employed in the transportation of natural gas through pipe lines thereby decreasing the initial cost of equipment required for such transportation. Operating costs of the equipment are likewise reduced, since the minor amount of leakage permitted is utilized in the operation of the compressor.

While I have described a preferred embodiment of my invention, it will be understood my invention is not limited thereto since it may be otherwise embodied within the scope of the following claims.

I claim:

1. In combination with a pipe line through which natural gas is transported from a source of supply to a place of use, a centrifugal compressor serving to boost the pressure of gas in said line, said compressor having a shaft, impellers mounted on the shaft to compress the gas, and seal members disposed on the shaft to minimize leakage of gas along the shaft, means for actuating the compressor, chambers for collecting gas escaping through the seal members, and means for utilizing at least a portion of the collected gas to supply power to actuate the compressor.

2. In combination with a pipe line through which natural gas is transported from a source of supply to a place of use, a centrifugal compressor serving to boost the pressure of gas in said line, said compressor having a shaft, impellers mounted on the shaft to compress the gas, seal members serving to minimize escape of gas along the shaft, means for actuating the compressor, piping connected to the seal members, said piping permitting gas penetrating the seal members to escape therethrough, a turbine for actuating the compressor, a boiler to supply steam to the turbine and a line connecting the piping with the burner of the boiler to permit escaped gas to be utilized in the operation of the boiler.

3. An arrangement according to claim 2 in which the seal members consist of labyrinths surrounding the compressor shaft at opposite sides of the impeller chamber.

4. An arrangement according to claim 1 in which the compressor comprises a casing, a shaft extending within the casing, an impeller chamber, impellers disposed on said shaft within the impeller chamber, bearing chambers at opposite ends of the shaft within the casing, labyrinths sealing the impeller chamber from the bearing chambers, a line connecting the bearing chambers to equalize pressure therein, a connection extending in the casing to each labyrinth to vent gas escaping through the labyrinths, piping supplying the escaped gas to a place of use for utilization in the supply of power to actuate the compressor, and piping connected to the bearing chambers to supply gas therein for utilization in the actuation of the compressor.

5. In combination with a pipe line through which natural gas is transported from a source of supply to a place of use, a centrifugal compressor to boost the pressure of gas in the line, said compressor comprising a casing, a shaft extending within the casing, an impeller chamber, impellers on said shaft, seal members on said shaft to minimize leakage of gas along the shaft, opening through the casing to each seal member to vent gas escaping through the seal members, and piping connected to the openings to supply the escaped gas to a place of use for utilization in the supply of power to actuate the compressor.

WALTER F. JONES.

REFERENCES CITED

The following references are of record in the file of this patent:

UNITED STATES PATENTS

| Number | Name | Date |
| --- | --- | --- |
| 319,365 | Westinghouse | June 2, 1885 |
| 2,069,161 | Griswold | Jan. 26, 1937 |

OTHER REFERENCES

Morgan: "Textbook of American Gas Practice," vol. 2, pages 203 to 212, published by J. J. Morgan, Maplewood, N. J., 1935.